United States Patent Office 3,352,884
Patented Nov. 14, 1967

3,352,884
1 - BENZENESULFONYL - 3 - (OXOCYCLOALKYL)-UREAS AND THE CYCLIC ALKYLENE KETALS THEREOF
Gunther S. Fonken, Charleston Township, Kalamazoo County, Milton E. Herr, Kalamazoo Township, Kalamazoo County, and Herbert C. Murray, Barry Township, Barry County, Mich., assignors to The Upjohn Company, Kalamazoo, Mich., a corporation of Delaware
No Drawing. Filed Feb. 1, 1965, Ser. No. 429,648
10 Claims. (Cl. 260—340.9)

This application is a continuation-in-part of copending application Ser. No. 353,611, filed Mar. 20, 1964, now abandoned.

This invention relates to a novel process for the introduction of oxygen into the cycloalkane ring of cycloalkyl arylsulfonyl ureas, to the novel oxygenated products thus produced and to novel derivatives thereof.

More particularly, this invention relates to a process for the introduction of oxygen into the cycloalkane ring of certain 1-benzenesulfonyl-3-cycloalkylureas, hereinafter defined, by subjecting said sulfonyl ureas to the oxygenating activity of a species of microorganism of Subphylum 2 of Phylum III, hereinafter identified, to the novel oxygenated 1-benzenesulfonyl-3-cycloalkylureas thus produced and to derivatives thereof.

The novel process and the bioconversion products of this invention are represented by the following reaction scheme:

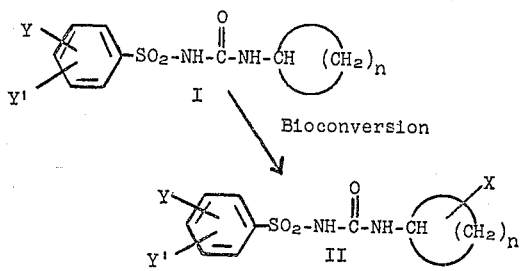

wherein $n$ is a whole number from 4 to 11, inclusive; Y and Y' are selected from the group consisting of hydrogen, lower-alkyl, lower-alkoxy, lower-alkanoyl and halogen; and X is selected from the group consisting of hydroxy and keto.

The novel compounds of this invention include those represented by Formula II above, the acylates of the compounds of Formula II wherein X is hydroxy, and the functional derivatives of the compounds of Formula II wherein X is keto, i.e., the cyclic (lower alkylene) ketals, oximes, phenylhydrazones, (lower-alkyl) hydrazones, semicarbazones and thiosemicarbazones.

In this application the term lower-alkyl means an alkyl radical of 1 to 8 carbon atoms, inclusive, such as methyl, ethyl, propyl, isopropyl, butyl, isobutyl, tert-butyl, isopentyl, hexyl, octyl and isomeric forms thereof; lower-alkoxy means an alkoxy radical of 1 to 8 carbon atoms, inclusive, such as methoxy, ethoxy, propoxy, isopropoxy, butoxy, sec-butoxy, tert-butoxy, hexyloxy, heptyloxy, octyloxy, and isomeric forms thereof; and lower-alkanoyl means an alkanoyl radical of 2 to 8 carbon atoms, inclusive, such as acetyl, propionyl, butyryl, isobutyryl, valeryl, hexanoyl, heptanoyl, octanoyl and isomeric forms thereof; halogen means chlorine, fluorine, iodine or bromine; lower alkylene means an alkylene radical of 2 to 8 carbon atoms, inclusive; and the term acylate means an ester wherein the acyl radical is that of a hydrocarbon carboxylic acid of 1 to 12 carbon atoms, inclusive, as more particularly defined and exemplified hereinafter; or an ester wherein the acyl radical is that of a hydrocarbon sulfonic acid of 1 to 12 carbon atoms, inclusive, as more particularly defined and exemplified hereinafter.

The compounds represented by Formula II above, wherein X is hydroxy or a functional derivative thereof such as an acylate, can exist in cis and trans forms and mixtures thereof. The cis and trans isomers can be separated and purified by conventional methods such as chromatography and/or crystallization.

The novel compounds of this invention are orally active antidiabetic agents useful for lowering blood sugar content in mammals, especially humans, to a safe level. For example, both 1-(p-tolylsulfonyl)-3-(4-hydroxycycloheptyl)urea and 1 - (p-tolylsulfonyl)-3-(4-oxocycloheptyl)urea have a hypoglycemic activity of about 4 times that of tolbutamide in glucose-primed, fasted, intact rats. In addition, the novel compounds are useful in animal feeds and animal feed supplements in the manner disclosed in U.S. Patent 2,941,884. The novel compounds are also useful as wetting, emulsifying and waterproofing agents in the paper and leather industries.

The compounds of this invention can be prepared and administered to mammals, including humans, laboratory animals and valuable domestic animals, in a wide variety of oral dosage forms, singly, or in admixture with other active compounds. They can be associated with a pharmaceutical carrier which can be solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The microbiological process of this invention comprises subjecting a 1-arylsulfonyl-3-cycloalkylurea (I) to the oxygenating activity of a species of Subphylum 2 of Phylum III to produce the oxygenated compounds of Formula II.

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology, sixth edition, 1957, Saunders Company, Philadelphia at page 10. This aforesaid Subphylum 2 of Phylum III embraces five classes, namely, Phycomycetes, Ascomycetes, Basidiomycetes, Deuteromycetes (Fungi imperfecti) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonadales and Actinomycetales. Among the families of the above listed orders, it is preferred to employ in the practice of this invention species of microorganisms falling within the families Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenangium, Adelopus, Chaetomium, Endothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

TABLE I

Phycomycetes:
- Entomophthorales__ Conidiobolus, Delacroixia.
- Mucorales_____ Absidia, Blakeslea, Circinella, Chaetocladium, Cunninghamella, Helicostylum, Gongronella, Mucor, Parasitella, Phycomyces, Rhizopus.
- Saprolegniales_____ Achlya.

Ascomycetes:
- Endomycetales_____ Ascocybe, Byssochlamys, Cephaloascus, Endomyces, Endomycopsis, Petasospora.
- Eurotiales_____ Ctenomyces, Carpenteles, Eidamella, Emericillopis, Eurotium, Microascus, Penicilliopsis, Talaromyces.
- Dothideales_____ Allophylaria, Cenangium, Co-Chaetothyrum, Cymadothea, Dangeardiella, Dothidea, Rhopographus, Scorias.
- Helotiales_____ Allophylaria, Cenangium, Corynella, Dermea, Godronia, Pezizella.
- Hemisphaeriales____ Schizothyrina, Schizothyrium.
- Hypocreales_____ Calonectria, Calostilbe, Claviceps, Cordyceps, Creonectria, Epichloe, Gibberella, Hypocrea, Hypomyces, Loramyces, Melanospora, Nectria, Nectriella, Neocosmospora, Ophionectria, Sphaerostilbe.
- Hysteriales_____ Farlowiella, Gloniella, Gloniopsis, Glonium Hysterium, Lophium, Mytilidion, Ostreion.
- Myriangiales_____ Dothiora, Elsinoe.
- Pezizales_____ Ascobolus, Discomycetella, Morchella, Patella, Pyronema, Sowerbyella, Wolfina.
- Phacidiales_____ Coccopeziza, Colpoma, Clithris, Phacidiella, Phacidium, Sphaerothyrium.
- Sphaeriales_____ Adelopus, Chaetomium, Chaetomidium, Clathrospora, Didymella, Endothia, Glomerella, Guignardia, Mycosphaerella Physalospora, Xylaria, Subbaromyces.
- Taphrinales_____ Protomyces, Taphridium Taphrina.

Basidiomycetes:
- Agaricales_____ Aleurodiscus, Alnicola, Boletus, Clavaria, Coprinus, Clitocybe, Collybia, Coniophora, Corticum, Deconica, Entaloma, Fomes, Hygrophorus, Lentinellus, Lentinus, Panaeolus Paxillus Peniophora Pholiota Pleurotus, Plicatura, Polyporus, Poria, Psalliota, Schizophyllum, Sparassis, Stereum, Tricholoma, Trametes.
- Lycoperdales_____ Bovista, Calvatia, Geastrum, Lycoperdon.
- Nidulariales_____ Crucibulum, Cyathus, Nidula, Sphaerobolus.

TABLE I.—Continued

- Phallales_____ Mutinus, Phallus, Simblum.
- Sclerodermatales___ Gastrosporium, Lycogalopsis, Phellorinia, Sphaerobolus, Tulostoma.
- Tremellales_____ Auricularia, Ceratobasidium, Calocera, Dacrymyces, Helicobasidium.
- Ustilaginales_____ Bryophytomyces, Cintractia, Entyloma, Farysia, Graphiola, Schizonella, Sorosporium, Tilletia, Tolyposporium, Urocystis, Ustilago.

Deuteromycetes:
- Melanconiales_____ Actinonema, Allelchaeta, Colletotrichum, Cryptosporium, Entomosporium, Melanconium, Myxosporium, Pestalotia, Septomyxa, Steganosporium, Tuberculariella.
- Moniliales_____ Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Penicillium, Sepedonium, Sporotrichum, Trichothecium.
- Mycelia Sterilia_____ Microxyphium, Papulospora, Rhizoctonia, Sclerotium.
- Sphaeropsidales_____ Ascochyta, Coniothyrium, Dendrophoma, Diplodia, Diplodina, Polyopeus, Sphaeropsis, Wojnowicia, Zythia.

Schizomycetes:
- Actinomycetales____ Micrococcus, Mycobacterium, Mycococcus, Nocardia, Streptomyces.
- Pseudomonadales___ Pseudomonas, Mycoplana, Protaminobacter.
- Eubacteriales_____ Aerobacter, Arthrobacter, Bacillus, Corynebacterium.

Cultures of a large number of species, falling within the group of microorganisms which can be employed in the process of the invention, are available from known sources such as the Northern Utilization Research and Development Branch, U.S. Department of Agriculture, Peoria, Illinois (NRRL), the American Type Culture Collection (ATCC), Washington, D.C., and Centraalbureau voor Schimmelcultures (CBS), Baarn, Holland or as otherwise indicated. The species listed in Table II, together with Culture Collection numbers, are typical of those which are available from the above sources and are representative of those which can be employed in the process of the invention.

TABLE II

Phycomycetes:
- *Achlya americana,* ATCC 10977
- *Achlya bisexualis,* ATCC 11397
- *Achlya crenulata,* ATCC 11315, CBS
- *Absidia cylindrospora,* ATCC 11516
- *Absidia cylindrospora,* NRRL 2796
- *Absidia cylindrospora,* var. rhizamorpha, NRRL 2815
- *Absidia pseudocylindrospora,* NRRL 2770
- *Absidia glauca,* ATCC 7852a, 7852b
- *Circinella angarensis,* NRRL 2410
- *Circinella angarensis,* NRRL 2628

TABLE II.—Continued

*Circinella spinosa*, ATCC 9025, CBS
*Cunninghamella blakesleeana*, ATCC 8688a
*Cunninghamella baineri*, ATCC 6794b
*Gongronella bulteri*, CBS
*Gongronella urceolifera*, CBS
*Gongronella lacrispora*, NRRL 2643
*Mucor griseocyanus*, ATCC 1207a
*Rhizopus arrhizus*, ATCC 11145
*Rhizopus nigricans*, ATCC 6227b Ascomycetes:
*Adelopus nudus*, CBS
*Cenangium abietis*, CBS
*Dermea balsama*, CBS
*Dermea libocedri*, CBS
*Eurotium echinulatum*, CBS
*Calonectria decora*, CBS
*Clithris quercina*, CBS
*Gibberella saubinettii*, CBS
*Hypomyces haematococcus*, CBS
*Chaetomium globosum*, ATCC 6205
*Gloniopsis brevisaccata*, CBS
*Glonium clavisporum*, CBS
*Glonium stellatum*, CBS
*Hysterium angustatum*, CBS
*Hysterium insidens*, CBS
*Mytilidion australe*, CBS
*Mytilidion hastenii*, CBS
*Mytilidion tortile*, CBS
*Endothia parasitica*, ATCC 9414
*Guignardia bidwelli*, ATCC 9559, 9560

Basidiomycetes:
*Alnicola escharoides*, CBS
*Boletus luteus*, CBS
*Boletus sp*, Peck 168 (Ohio State Univ.)
*Coprinus narcoticus*, CBS
*Corticium sasakkii*, NRRL 2705
*Corticium microsclerotia*, NRRL 2727
*Clavaria stricta*, CBS
*Deconica atrorufa*, CBS
*Deconica coprophila*, CBS
*Cyathus poeppigii*, CBS
*Cyathus olla*, CBS
*Pleurotus passeckerianus*, ATCC 9416
*Pholiota adiposa*, ATCC 9393
*Poria ambigua*, ATCC 9408
*Sphaerobolus stellatus*, CBS Deuteromycetes:
*Alternaria tenuis*, ATCC 6663
*Aspergillus nidulans*, ATCC 11267
*Aspergillus niger*, ATCC 9027
*Aspergillus niger*, ATCC 9142
*Aspergillus niger*, ATCC 10579
*Aspergillus niger*, ATCC 8740
*Aspergillus proliferans*, CBS
*Aspergillus ruber*, ATCC 9481
*Aspergillus versicolor*, ATCC 9577
*Brachysporium oryzae*, ATCC 11571, CBS
*Cladosporium resinae*, NRRL 2778
*Curvularia lunata*, ATCC 12017
*Curvularia pallescens*, ATCC 12017, NRRL 2381
*Cylindrium suaveolens*, CBS
*Cylindrocarpon didymum*, CBS
*Cylindrocarpon radicicola*, ATCC 11811
*Fusarium culmorum*, ATCC 12656
*Helicodendron tubulosum*, CBS, ATCC 7808
*Helicosporium lumbricopsis*, CBS
*Helicosporium phragmitis*, CBS
*Helminthosporium carbonum*, ATCC 9627
*Keratinomyces ajelloi*, CBS
*Penicillium atrovenetum*, CBS
*Penicillium aurantio-virens*, ATCC 10413, NRRL 2138
*Penicillium patulum*, ATCC 9260, 10120, NRRL 994

*Rhizoctonia solani*, ATCC 6221, 10154, 10157, 10159, 10163
*Sepedonium ampullosporum*, CBS
*Sporotrichum sulfurescens*, ATCC 7159
*Trichothecium roseum*, ATCC 8685, NRRL 1665
*Ascochyta linicola*, NRRL 2923, CBS
*Diplodia natalensis*, ATCC 9055
*Septomyxa affinis*, ATCC 6737
*Wojnowicia graminis*, CBS
*Zythia resinae*, CBS Schizomycetes:
*Mycobacterium rhodochrous*, ATCC 999, 4273, 4276
*Micrococcus flavoroseus*, ATCC 397
*Micrococcus cerolyticus*, ATCC 12559
*Micrococcus cinnabareus*, ATCC 11890
*Micrococcus rubens*, ATCC 186
*Nocardia corallina*, CBS, ATCC 4273, 2161
*Nocardia erythropolis*, CBS, ATCC 4277
*Nocardia gardneri*, ATCC 9604
*Nocardia restrictus*, CBS
*Aerobacter aerogenes*, ATCC 8724
*Streptomyces roseochromogenus*, ATCC 3347
*Streptomyces argenteolus*, ATCC 11009
*Streptomyces olivaceus*, ATCC 12019
*Streptomyces mediocidicus*, ATCC 13279
*Streptomyces mediocidicus*, ATCC 13278
*Pseudomonas aeruginosa*, ATCC 8689
*Pseudomonas fluorescens*, ATCC 949
*Cornyebacterium simplex*, ATCC 6946

The starting compounds (I) for the process of this invention, many of which are known in the art, for example, U.S. Patent 3,005,022 and British Patent 929,791, can be prepared by reacting an arylsulfonylurethane of the formula:

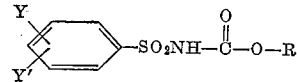

wherein Y and Y' have the meanings previously given and R represents alkyl of 1 to 6 carbon atoms, inclusive, with a cycloalkylamine of the formula:

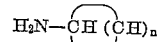

wherein $n$ has the meaning previously given, according to the process disclosed by Marshall et al., J. Org. Chem., 23, 927 (1958), and illustrated in Preparation 1 herein.

The starting arylsulfonylurethanes, many of which are known, can be prepared as disclosed by Marshall et al., supra.

The operational conditions and reaction procedures are advantageously those known in the art of bioconversion as illustrated in Murray et al., U.S. Patents 2,602,769 and 2,735,800.

In the practice of this invention, the bioconversion can be effected by a growing or resting culture of the microorganism or by spores, washed cells or enzymes of the microorganism.

Culture of the selected species of microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines and starches; meat extracts, peptones, amino acids, proteins, fatty acids, glycerol, whey and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range as suitable.

The substrate can be added to the culture during the growth period of the microorganism as a single feed or by gradual addition during the conversion period, or it can be added to the medium before or after sterilization or inoculation, making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate, when it is a solid, in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such range as supports life, active growth or the enzyme activity of the microorganism; the range of 20 to 35° C. is preferred. A pH of about 4 to 6 is generally preferred for growth of the microorganism during the bioconversion but for acid-sensitive substrates, and for microorganisms of the class Schizomycetes, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961) Reinhold Publishing Co., New York, N.Y.].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Patents 3,031,379 and 3,031,382. The separation of washed cells from the fermentation medium is well known in the art, see for example, U.S. Patent 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate, under aerobic fermentation conditions.

After completion of the fermentation, the resulting oxygenated products are recovered from the fermentation beer by conventional methods. For example, the whole beer can be extracted with a water-immiscible organic solvent, e.g., methylene chloride, chloroform, carbon tetrachloride, ethylene chloride, trichloroethylene, ether, amyl acetate, benzene, and the like; or the beer and mycelia can be separated by conventional methods such as centrifugation or filtration, and then separately extracted with suitable solvents. The mycelia can be extracted with either water-miscible or water-immiscible solvents or, in cases where little or no product is contained in the mycelia, merely washed with water and the wash water added to the beer filtrate. The beer, free of mycelia, can then be extracted with water-immiscible solvents such as those listed above. The extracts are combined, dried over a drying agent such as anhydrous sodium sulfate, and the solvent removed by conventional methods such as evaporation or distillation at atmospheric or reduced pressure. The oxygenated products thus obtained can be isolated and purified by conventional methods, e.g., recrystallization, chromatography, distillation in the case of liquids, and the like.

The compounds of Formula II wherein X is hydroxy can be oxidized in accordance with methods known in the art for oxidizing secondary hydroxy groups to ketones, for example, Fieser and Fieser, Natural Products Related to Phenanthrene, 3rd ed., pages 127–129, Reinhold Publishing Corp., New York, N.Y. Thus, the compounds of Formula II are dissolved in an inert organic solvent such as acetone, benzene, methylene chloride, t-butanol, and the like, and then oxidized with aqueous chromic acid, potassium permanganate, t-butyl hypochlorite and like oxidizing agents to produce the keto compounds.

It is sometimes advantageous to oxidize the mixture of compounds obtained from the bioconversion without attempting to separate the mixture into its components in order to obtain a mixture of the keto compounds which are in some instances more easily separated and purified.

The compounds of Formula II wherein X is keto can, if desired, be reduced, preferably under neutral or acidic conditions in accordance with methods known in the art for reducing carbonyl groups to the hydroxy compounds. For example, reduction can be conveniently accomplished with hydrogen in the presence of a catalyst such as palladium, platinum or Raney nickel under neutral conditions; sodium in an alkanol; lithium aluminum hydride, sodium borohydride, lithium tritertiary butoxy aluminum hydride, and the like.

The compounds of Formula II wherein X is hydroxy can be acylated in accordance with methods known in the art for acylating secondary hydroxy groups, for example, by reaction with the selected acid anhydride or acid halide and by reaction with an acid in the presence of an esterification catalyst.

Acylating agents which can be employed in the preparation of the above acylates are organic carboxylic acids, particularly hydrocarbon carboxylic acids containing from 1 to 12 carbon atoms, inclusive, or acid anhydrides or acid halides thereof. Illustrative of hydrocarbon carboxylic acids employed in the formation of the acylates of this invention, includes saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like.

Acylating agents which can also be used are sulfonic acid halides which are generally employed in the presence of a solvent such as pyridine, benzene, toluene, and the like, in accordance with the procedure disclosed in U.S. Patent 3,105,083, to produce the desired sulfonic acid acylates of this invention. Illustrative of sulfonic acid acylating agents are the acid halides of saturated aliphatic sulfonic acids, such as methane sulfonic, ethanesulfonic, propanesulfonic, butanesulfonic, pentanesulfonic, hexanesulfonic, nonanesulfonic dodecanesulfonic, 2-propanesulfonic, 2-butanesulfonic, 2-pentanesulfonic, 2-octanesulfonic, tertiarybutanesulfonic; saturated cycloaliphatic sulfonic acids such as cyclopentanesulfonic and cyclohexanesulfonic; aralkyl sulfonic acids such as phenylmethanesulfonic and phenylethanesulfonic; and aryl sulfonic acids such as benzenesulfonic, o-toluenesulfonic, p-toluenesulfonic, o-bromobenzenesulfonic, p-bromobenzenesulfonic, o-chlorobenzenesulfonic, p-chlorobenzenesulfonic, o-, m-, p-nitrobenzenesulfonic, anisole-2-sulfonic, anisole-4-sulfonic, and the like.

The compounds of Formula II wherein X is keto can be reacted with ketalizing agents in accordance with methods known in the art to produce the corresponding ketals. For example, the said ketones can be ketalized by reacting the selected compound with an alkanediol selected from the group of alkane-1,2-diols or alkane-1,3-diols containing up to and including eight carbon atoms, such as ethylene, propylene, trimethylene, 1,2-butylene, 2,4-pentylene, 4-methyl-1,2-pentylene, 6-methyl-1,3-hexylene, 1,2-heptylene, 3,4-heptylene, 1,2-octylene, and the like; preferably in an organic solvent such as benzene, toluene, xylene, methylene chloride, and the like, and in the presence of an acid catalyst such as p-toluenesulfonic acid, benzenesulfonic acid and the like. The reaction is conducted at a temperature between about 20° C. and about 200° C., preferably between about 40° C. and about 150° C. The time required for the reaction is not critical and may be varied between about one and 48 hours, depending on the temperature, the ketalizing agent and catalyst employed.

Other derivatives of the compounds of Formula II, wherein X is keto, for example, oximes, hydrazones, phenylhydrazones, lower-alkylhydrazones, semicarbazones, thiosemicarbazones, and the like, are included within the scope of this invention. These ketonic derivatives can be prepared in accordance with known methods as described in Identification of Organic Compounds, Shriner and Fuson, Chapter VIII, John Wiley and Sons, Inc., New York, N.Y.

The acylates, cyclic alkylene ketals and other ketonic derivatives of Formula II can, if desired, by hydrolyzed in accordance with methods known in the art, example, using aqueous acids or bases to give the corresponding free-hydroxy and free-keto compounds.

Alternatively, the compounds of this invention, represented by Formula II, and the 3-ketalized derivatives thereof, can be prepared chemically by reacting an arylsulfonylurethane (III) with an oxygenated cycloalkylamine (IV) in accordance with the procedure hereinbefore disclosed for preparing the starting compounds (I), as shown by the following reaction scheme:

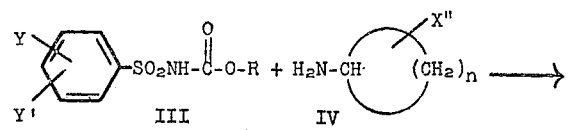

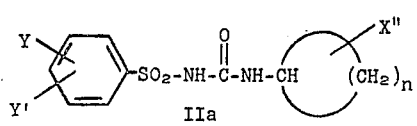

wherein $n$, R, Y and Y' have the same meanings as previously given and X" is hydroxy, keto or cyclic lower-alkylene ketal.

The term "cyclic lower-alkylene ketal" means a substituent of the formula:

wherein Z is a lower alkylene radical preferably containing from 2 to 8 carbon atoms, inclusive, and the attaching oxygen to carbon bonds are separated by a chain of at least 2 and not more than 3 carbon atoms, e.g., ethylene, propylene, trimethylene, 2,2-dimethyltrimethylene, 1,2-butylene, 2,4-pentylene, 4-methyl-1,2-pentylene, 1,3-hexylene, 3,4-heptylene, 1,2-octylene and the like.

The oxygenated cycloalkylamines (IV) are prepared from the corresponding ketalized N-(oxocycloalkyl)benzamides and the N-(hydroxycycloalkyl)benzamides in accordance with the following reaction scheme:

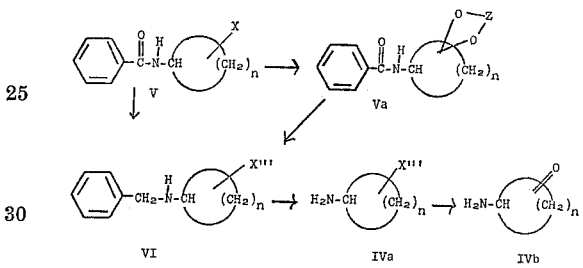

wherein $n$, X and Z have the same meanings as previously given and X''' is hydroxy or cyclic lower-alkylene ketal, as hereinbefore defined. The process for preparing the oxygenated cycloalkylamines of Formula IV comprises reducing the selected N-(hydroxycycloalkyl)benzamide (V) or N-(oxocycloalkyl)benzamide cyclic alkylene ketal (Va) with a reducing agent in accordance with methods known in the art for reducing amides to amines, for example using lithium aluminum hydride to produce the corresponding benzyl cycloalkylamine (VI). The reaction is carried out in a suitable organic solvent such as ethers, e.g., dibutyl ether, diethyl ether etc. tetrahydrofuran benzene, benzene-ether, and the like. The reaction can be carried out at temperatures within the range of about 25° C. to the boiling point of the solvent used. When the reaction is complete the excess hydride is decomposed by the addition of water and the amine (VI) thus obtained, is separated from the reaction mixture by conventional methods e.g., evaporation of the solvent followed by filtration and crystallization. The crude amine can be purified by recrystallization and/or chromatography.

The benzyl cycloalkylamines (VI) are then subjected to catalytic hydrogenolysis using a palladium-charcoal catalyst to obtain the corresponding cycloalkylamines (IVa). The hydrogenolysis can be carried out at temperatures within the range of about 0 to 150° C. and at any convenient pressure range. A pressure within the range of about 1 to 40 p.s.i.g. and a temperature of about 25° C. are advantageously employed. The cycloalkyl amine (IVa) thus obtained, can be further purified by conventional methods such as crystallization and/or chromatography or it can be used directly in the next step without further purification. When a ketal group is present in the compounds of Formula IVa, the ketal group can if desired be removed my hydrolysis in accordance with known methods to obtain the free ketone (IVb), for example using an aqueous acid such as sulfuric, hydrochloric, hydrobromic, perchloric, p-toluenesulfonic, oxalic, acetic and the like, in the presence of an inert organic solvent such as tetrahydrofuran, acetone, a lower alkanol, dioxane, dimethylformamide and the like. The hydrolysis can be carried out within a relatively wide temperature range such as from 0° to about 50° C.

or higher. A temperature of about 25° C. is moderately elevated temperatures are advantageous. The time required for hydrolysis depends on the acid and temperature employed, a period of about 1 to 8 hours, is generally sufficient at the preferred temperature range. When the hydrolysis is complete the reaction mixture is neutralized with a base to remove any acid addition salts formed during the hydrolysis. Bases which can be used are sodium, calcium or potassium hydroxides, carbonates, bicarbonates and the like. The free oxocycloalkylamine (IVb) can be recovered from the reaction medium and purified by conventional methods.

The N-(oxocycloalkyl)benzamides and N-(hydroxycycloalkyl)benzamides of Formula V which are used as starting materials for the preparation of the compounds of Formula IV can be prepared by subjecting a N-(cycloalkyl)benzamide of the formula:

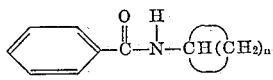

wherein $n$ has the same meaning as hereinbefore given, to bioconversion in the same manner as hereinbefore disclosed in a process of this invention for the oxygenation of the cycloalkyl ring of cycloalkyl arylsulfonyl ureas, as illustrated by examples 13 through 19 herein.

The following preparations and examples are intended to illustrate the process of this invention as applied to representative and typical individual organisms. The examples are for the purpose of illustrating the best mode contemplated of carrying out the invention and to supplement the foregoing disclosure of the invention with additional descriptions of the manner and process of carrying out the invention so as to further enable workers skilled in the art to do so.

PREPARATION 1

1-(p-tolylsulfonyl)-3-cyclododecylurea

A mixture of 27.8 g. of methyl p-tolylsulfonylcarbamate and 18.3 g. of cyclododecylamine was heated at 135° C. After 15 minutes of liquefaction and frothing the mixture became solid. Heating was continued for 15 minutes, and the material was dissolved in boiling ethanol and allowed to crystallize, giving 26.2 g. of 1-(p-tolylsulfonyl)-3-cyclododecylurea, M.P. 177–178° which after recrystallization from 95% ethanol melted at 178.5–180° C.

*Analysis.*—Calcd. for $C_{20}H_{32}N_2O_3S$: C, 63.13; H, 8.48; N, 7.36; S, 8.41. Found: C, 63.80; H, 8.61; N, 7.29; S, 8.43.

EXAMPLE 1

Oxygenation of 1-(p-tolylsulfonyl)-3-cycloheptylurea

A medium was prepared of 10 g. of cornsteep liquor (60% solids), 5 g. of commercial dextrose and 11. of tap water and adjusted to a pH of 4.84. One hundred twenty-five liters of this medium was sterilized and inoculated with a 72-hour vegetative growth of *Sporotrichum sulfureascens*, ATCC 7159 and incubated at a temperature of about 28° C. with aeration at the rate of 7.5 l. per minute and stirring at 30 r.p.m. After 19 hours, or when a moderate to heavy growth of mycelium was apparent, a solution of 25 g. of 1-(p-tolylsulfonyl)-3-cycloheptylurea in 150 ml. of N,N-dimethylformamide was added to the fermentation. After an additional 72-hour period of incubation, the whole beer was filtered and the filtered beer was adjusted to pH 1 by addition of concentrated sulfuric acid, and extracted 4 times with a volume of methylene chloride equal to about one-fourth the volume of the filtered beer. The combined extracts were washed with one-fourth volume of distilled water and the solvent was removed by distillation to give a mixture of oxygenated 1-(p-tolylsulfonyl)-3-cycloheptylureas, the major component of which was 1-(p-tolylsulfonyl)-3-(4-hydroxycycloheptyl)urea. Other components were 1-(p-tolylsulfonyl)-3-(3-hydroxycycloheptyl)urea, 1-(p-tolylsulfonyl)-3-(4-oxocycloheptyl)urea and 1-(p-tolylsulfonyl)-3-(3-oxocycloheptyl)urea. The mixture thus obtained was chromatographed on silica gel packed as an ethyl acetic slurry. Development of the column was with 0.3% acetic acid in ethyl acetate. Eluate fractions of 335 ml. volume were collected and analyzed by thin-layer chromatography on silica gel. The fractions containing 1-(p-tolylsulfonyl)-3-(4-hydroxycycloheptyl)urea were combined and the solvent was evaporated. The residue thus obtained was stirred with ethyl acetate to give 4.45 g. of a mixture of the cis and trans forms of 1-(p-tolylsulfonyl)-3-(4-hydroxycycloheptyl)urea, M.P. 116–123°. The pure trans isomer was obtained by recrystallization of the mixture from ethyl acetate-Skellysolve B (isomeric hexanes hereinafter referred to as Skellysolve B), M.P. 134–136° C.

*Analysis.*—Calcd. for $C_{15}H_{22}N_2O_4S$: C, 55.2; H, 6.8; N, 8.6; S, 9.8. Found: C, 55.2; H, 7.1; N, 8.4; S, 9.9.

The cis isomer was isolated from the mixture by recrystallization from acetone-Skellysolve B, M.P. 178–180° C.

*Analysis.*—Calcd. for $C_{15}H_{22}N_2O_4S$: C, 55.2; H, 6.8; N, 8.6; S, 9.8; O, 19.6. Found: C, 55.6; H, 6.4; N, 8.3; S, 9.7; O, 20.0.

EXAMPLE 2

Oxygenation of 1-(p-tolylsulfonyl)-3-cyclopentylurea

The procedures of Example 1 were repeated using 10 l. of sterilized medium of the same composition, 2 g. of 1-(p-tolylsulfonyl)-3-cyclopentylurea as the substrate and a rate of aeration of 0.5 l. of air per minute. The residue from each of the eluate fractions thus obtained were assayed by thin-layer chromatography and found to be comprised chiefly of two components which were designated A and B. The fractions comprised essentially of component A were triturated with ethyl acetate to give 0.30 g. of 1-(p-tolylsulfonyl)-3-(3-cis-hydroxycyclopentyl)urea, M.P. 153–156° C.

The fractions comprised essentially of component B were combined and triturated with ethyl acetate to give 0.14 g. of 1-(p-tolylsulfonyl)-3-(3-trans-hydroxycyclopentyl)urea, M.P. 137–141° C.

EXAMPLE 3

Oxygenation of 1-(p-acetylbenzenesulfonyl)-3-cyclohexylurea

The procedures of Example 1 were repeated as in Example 2 using 2 g. of 1-(p-acetylbenzenesulfonyl)-3-cyclohexylurea as the substrate to give 1-(p-acetylbenzenesulfonyl)-3-(4-hydroxycyclohexyl)urea as the major product and 1-(p-acetylbenzenesulfonyl)-3-(3-hydroxycyclohexyl)urea as the minor product. The eluate fractions containing the bulk of the bioconversion product were combined and recrystallized from acetone-Skellysolve B to give 0.31 g. of 1-(p-acetylbenzenesulfonyl)-3-(4-hydroxycyclohexyl)urea, M.P. 170–173° C.

1-(p-acetylbenzenesulfonyl)-3-(3-hydroxycyclohexyl)urea can be isolated from the mother liquor by additional chromatography.

EXAMPLE 4

Oxygenation of 1-(p-tolylsulfonyl)-3-cyclododecylurea

The bioconversion and extraction procedures of Example 1 were repeated using 10 l. of sterilized medium of the same composition, 2 g. of 1-(p-tolylsulfonyl)-3-cyclododecylurea as the substrate, a rate of aeration of 0.5 l. per minute and stirring at 200 r.p.m. The product thus obtained was assayed by paper strip chromatography and found to consist of a mixture of oxygenated 1-(p-tolylsulfonyl)-3-cyclododecylureas of which the major components were 1-(p-tolylsulfonyl)-3-(5-hydroxycyclododecyl)urea, 1-(p-tolylsulfonyl) - 3 - (6-hydroxycyclododecyl)urea and 1-(p-tolylsulfonyl)-3-(7-hydroxycyclododecyl)urea.

EXAMPLE 5

*Oxygenation of 1-(p-tolylsulfonyl)-3-cyclohexylurea*

Following the procedures of Example 1 and substituting 1-(p-tolylsulfonyl)-3-cyclohexylurea for 1-(p - tolylsulfonyl)-3-cycloheptylurea and *Rhizopus arrhizus*, ATCC 11145, in place of *Sporotrichum sulfurescens* is productive of 1-(p-tolylsulfonyl)-3-(4 - hydroxycyclohexyl)urea and 1-(p-tolylsulfonyl) - 3 - (3-hydroxycyclohexyl)urea which can be separated by chromatography.

In the same manner following the procedure of Example 1 other 1 - benzenesulfonyl-3-cycloalkylureas of Formula I are likewise oxygenated on the cycloalkane ring with a species of microorganism of Subphylum 2 of Phylum III, for example, those species listed in Table II above, to produce the oxygenated compounds (II). The following conversions showing the major products produced in each are representative: 1-(m-ethoxybenzenesulfonyl)-3-cyclopentylurea using *Cladosporium resinae*, NRRL 2728, to give 1-(m-ethoxybenzenesulfonyl)-3-(3-hydroxycyclopentyl)urea; 1 - (o-butylbenzenesulfonyl)-3-cyclopentylurea using *Circinella angarensis*, NRRL 2628, to give 1-(o-butylbenzenesulfonyl)-3-(3-hydroxycyclopentyl)urea; 1 - (p-chlorobenzenesulfonyl)-3-cyclopentylurea using *Absidia glauca*, ATCC 7852a, to give 1-(p-chlorobenzenesulfonyl)-3 - (3-hydroxycyclopentyl)urea; 1-(o-butylbenzenesulfonyl)-3-cycloheptylurea using *Gongronella butleri*, CBS, to give 1-(o-butylbenzenesulfonyl)-3-(4-hydroxycycloheptyl)urea and 1-(o-butylbenzenesulfonyl)-3-(3 - hydroxycycloheptyl)urea; 1 - (p-chlorobenzenesulfonyl)-3-cycloheptylurea using *Cunninghamella blakesleeana*, ATCC 8688a, to give 1-(p-chlorobenzenesulfonyl) - 3-(4 - hydroxycycloheptyl)urea and 1-(p-chlorobenzenesulfonyl)-3 - (3 - hydroxycycloheptyl)urea; 1-(3,4-xylylsulfonyl)-3-cycloheptylurea using *Endothia parasiticus*, ATCC 9414, to give 1-(3,4-xylylsulfonyl)-3-(4-hydroxycycloheptyl)urea and 1-(3,4-xylylsulfonyl)-3-(3-hydroxycycloheptyl)urea; 1 - benzenesulfonyl-3-cyclohexylurea using *Guignardia bidwelli*, ATCC 9559, to give 1-benzenesulfonyl - 3-(4-hydroxycyclohexyl)urea and 1-benzenesulfonyl - 3 - (3-hydroxycyclohexyl)urea; 1-(m-tolylsulfonyl)-3 - cyclohexylurea using *Calonectria decora*, CBS, to give 1-(m-tolylsulfonyl)-3-(4-hydroxycyclohexyl)urea and 1-(m-tolylsulfonyl)-3-(3 - hydroxycyclohexyl)urea; 1 - (2,4-xylylsulfonyl)-3-cyclohexylurea using *Chaetomium globosum*, ATCC 6205, to give 1-(2,4-xylylsulfonyl)-3-(4 - hydroxycyclohexyl)urea and 1-(2,4-xylylsulfonyl)-3-(3-hyroxycyclohexyl)urea; 1 - (p-isopropylbenzenesulfonyl)-3 - cyclohexylurea using *Corticum sasakii*, NRRL 2705, to give 1-(p-isopropylbenzenesulfonyl)-3-(4-hydroxycyclohexyl)urea and 1-(p - isopropylbenzenesulfonyl)-3-(3-hydroxycyclohexyl)urea; 1 - (p-bromobenzenesulfonyl)-3-cyclooctylurea using *Deconica coprophila*, CBS, to give 1-(p-bromobenzenesulfonyl)-3-(5-hydroxycyclooctyl)urea, 1-(p-bromobenzenesulfonyl)-3-(4-hydroxycyclooctyl)urea and 1-(p-bromobenzenesulfonyl)-3-(3-hydroxycyclooctyl)urea; 1 - (m-methoxybenzenesulfonyl)-3-cyclooctylurea using *Cyathus poeppigii*, CBS, to give 1-(m-methoxybenzenesulfonyl)-3-(5 - hydroxycyclooctyl)urea, 1-(m - methoxybenzenesulfonyl)-3-(4-hydroxycyclooctyl)urea and 1-(m-methoxybenzenesulfonyl)-3-(3-hydroxycyclooctyl)urea; 1 - (3,4-diethylbenzenesulfonyl) - 3 - cyclooctylurea using *Aspergillus niger*, ATCC 9027, to give 1-(3,4-diethylbenzenesulfonyl)-3-(5-hydroxycyclooctyl)urea, 1-(3,4-diethylbenzenesulfonyl)-3-(4-hydroxycyclooctyl)urea and 1 - (3,4-diethylbenzenesulfonyl)-3-(3 - hydroxycyclooctyl)urea; 1-(3-butyrylbenzenesulfonyl) - 3 - cyclononylurea using *Septomyxa affinis*, ATCC 3737, to give 1-(3-butyrylbenzenesulfonyl)-3-(5 - hydroxycyclononyl)urea, 1-(3-butyrylbenzenesulfonyl) - 3-(4 - hydroxycyclononyl)urea and 1-(3-butyrylbenzenesulfonyl)-3-(3 - hydroxycyclononyl) urea; 1-(p-ethylbenzenesulfonyl)-3-cyclononylurea using *Curvularia lunata*, ATCC 12,017, to give 1-(p-ethylbenzenesulfonyl)-3-(5-hydroxynonyl)urea, 1 - (p-ethylbenzenesulfonyl)-3-(4-hydroxynonyl)urea and 1 - (p-ethylbenzenesulfonyl)-3-(3-hydroxynonyl)urea; 1 - (p-hexyloxybenzenesulfonyl)-3 - cyclononylurea using *Cylindrocarpon radicola*, ATCC 1101, to give 1-(p-hexyloxybenzenesulfonyl)-3-(5-hydroxycyclononyl)urea, 1 - (p-hexyloxybenzenesulfonyl)-3-(4 - hydroxycyclononyl)urea and 1-(p-hexyloxybenzenesulfonyl)-3-(3 - hydroxycyclononyl) urea; 1-(2,4-dichlorobenzenesulfonyl)-3 - cyclodecylurea using *Wojnowicia graminis*, CBS, to give 1-(2,4-dichlorobenzenesulfonyl)-3-(5-hydroxycyclodecyl)urea, 1 - (2,4-dichlorobenzenesulfonyl)-3-(4 - hydroxycyclodecyl)urea and 1-(2,4-dichlorobenzenesulfonyl)-3-(3 - hydroxycyclodecyl)urea; 1-benzenesulfonyl-3 - cycloundecylurea using *Penicillium patulum*, ATCC 9260, to give 1-benzenesulfonyl-3-(6-hydroxycycloundecyl)urea, 1-benzenesulfonyl-3-(5 - hydroxycycloundecyl)urea and 1-benzenesulfonyl-3-(4-hydroxycycloundecyl)urea; and 1 - (m - chlorobenzenesulfonyl) - 3 - cyclododecylurea using *Ascochyta linicola*, NRRL 2923, to give 1-(m-chlorobenzenesulfonyl)-3-(7-hydroxycyclododecyl)urea, 1-(m - chlorobenzenesulfonyl)-3-(6-hydroxycyclododecyl)urea and 1-(m-chlorobenzenesulfonyl)-3-(5 - hydroxycyclododecyl)urea.

When species of the class Schizomycetes are employed in the procedures of Example 1, a pH of about 7 is preferably maintained during the bioconversion. The following conversions showing the major products produced in each are representative: 1-(o-tolylsulfonyl)-3 - cyclohexylurea using *Nocardia corallina*, ATCC 4273, to give 1-(o-tolylsulfonyl)-3-(4-hydroxycyclohexyl)urea and 1-(o - tolylsulfonyl)-3-(3-hydroxycyclohexyl)urea; 1-(2,3 - diacetylbenzenesulfonyl)-3 - cyclohexylurea using *Pseudomonas aeruginosa*, ATCC 8689, to give 1-(2,3-diacetylbenzenesulfonyl)-3-(4-hydroxycycloheptyl)urea and 1-(2,3 - diacetylbenzenesulfonyl)-3-(3-hydroxycycloheptyl)urea.

EXAMPLE 6

*Oxygenation of 1-(3,4-dichlorobenzenesulfonyl)-3-cycloheptylurea*

A medium is prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil is added as a foam preventive. Ten l. of this sterilized medium is inoculated with a 72- hour vegeatitive of *Mycobacterium rhodochrous*, ATCC 4276, and incubated for 48 hours at a temperature of about 28° C. with aeration at the rate of 0.5 l. per minute and stirring at 300 r.p.m. At the end of this period, a solution of 2.5 g. of 1-(3,4-dichlorobenzenesulfonyl)-3-cycloheptylurea in 25 ml. of dimethylformamide is added to the inoculated medium. After an additional 72-hour period of incubation, the beer and mycelium are separated by filtration and extracted in the same manner as described in Example 1 to give a residue containing a mixture of microbially oxygenated 1-(3,4-dichlorobenzenesulfonyl)-3-cycloheptylureas of which the major components are 1-(3,4-dichlorobenzenesulfonyl)-3-(4-hydroxycycloheptyl)urea and 1-(3,4-dichlorobenzenesulfonyl)-3-(3-hydroxycycloheptyl)urea. The oxygenated products are separated by chromatography and purified by recrystallization.

In the same manner following the procedure of Examples 1–6, the 1-benzenesulfonyl-3-cycloalkylureas of Formula I can be microbially oxygenated using a species of Subphyllum 2 of Phylum III, for example, those species listed in Table II above, to give as the major components the 1 - benzenesulfonyl - 3 - (hydroxycycloalkyl)ureas of Formula II. The procedure of Example 6 is preferred for species of the class Schizomycetes. The following species are typical:

Adelopus nudus, CBS
Gloniopsis brerisaccata, CBS
Glonium stellatum, CBS
Hysterium angustatum, CBS
Mytillidion kastenii, CBS
Gibberella saubinettii, CBS
Hypomyces haematococcus, CBS
Dermea balsama, CBS
Cenangium abietus, CBS
Boletus sp. Peck 168 (Ohio State Univ.)
Alnicola escharoides, CBS
Corticium microsclerotia, NRRL 2727
Sphaerobolus stellatus, NRRL 2922
Diplodia natalensis, ATCC 9055
Keratinomyces ajelloi, CBS
Trichothecium roseum, NRRL 1665
Brachysporium oryzae, ATCC 11571
Rhizoctonia solani, ATCC 6221
Achlya americana, ATCC 10977
Mucor griseocyanus, ATCC 1207a
Rhizopus nigrincans, ATCC 11145
Micrococcus cerolyticus, ATCC 12559
Streptomyces olivaceus, ATCC 12019 and the like.

EXAMPLE 7

*1-(p-tolylsulfonyl)-3-(4-oxocycloheptyl)urea*

Oxidation of 100 mg. of 1-(p-tolylsulfonyl)-3-(4-trans-hydroxycycloheptyl)urea in 6 ml. of acetone at room temperature with an excess of 2.67 M chromic acid (Jones' reagent), and recrystallization of the product, first from aqueous acetone and then from acetone-Skellysolve B, gave 53 mg. of 1-(p-tolylsulfonyl)-3-(4-oxocycloheptyl) urea, M.P. 185–186.5° C.

Similarly, oxidation of 1-(p-tolylsulfonyl)-3-(4-cis-hydroxycycloheptyl)urea in glacial acetic acid gave the same product, 1-(p-tolylsulfonyl)-3-(4-oxocycloheptyl) urea.

EXAMPLE 8

*1-(p-tolylsulfonyl)-3-(3-oxocyclopentyl)urea*

Oxidation of 70 mg. of 1-(p-tolylsulfonyl)-3-(3-cis-hydroxycyclopentyl)urea by the method of Example 7 gave 1-(p-tolylsulfonyl)-3-(3-oxocyclopentyl)urea, M.P. 161–162° C. (dec.).

Oxidation of 42 mg. of 1-(p-tolylsulfonyl)-3-(3-trans-hydroxycyclopentyl)urea in the same manner gave 1-(p-tolylsulfonyl)-3-(3-oxocyclopentyl)urea, M.P. 162–164.5° C. (dec.), identical to the product obtained above.

EXAMPLE 9

*1-(p-acetylbenzenesulfonyl)-3-(4-oxocyclohexyl)urea*

Oxidation of 50 mg. of 1-(p-acetylbenzenesulfonyl)-3-(4-hydroxycyclohexyl)urea by the method of Example 7 afforded 1-(p-acetylbenzenesulfonyl)-3-(4-oxocyclohexyl) urea which was identified by its infrared spectrum.

In the same manner, following the procedure of Example 7 or 8, other 1-benzenesulfonyl-3-(hydroxycycloalkyl)ureas of Formula II wherein X is hydroxy, can be oxidized to 1 - benzenesulfonyl - 3-(oxocycloalkyl)ureas. The following products are representative:

1-(m-ethoxybenzenesulfonyl)-3-(3-oxocyclopentyl)urea,
1-(p-chlorobenzenesulfonyl)-3-(3-oxocyclopentyl)urea,
1-benzenesulfonyl-3-(4-oxocyclohexyl)urea,
1-(2,4-xylylsulfonyl)-3-(3-oxocyclohexyl)urea,
1-(3,4-xylylsulfonyl)-3-(4-oxocycloheptyl)urea,
1-(o-butylbenzenesulfonyl)-3-(3-oxocycloheptyl)urea,
1-(p-bromobenzenesulfonyl)-3-(5-oxocyclooctyl)urea,
1-(m-methoxybenzenesulfonyl)-3-(4-oxocyclooctyl)urea,
1-((3,4-diethylbenzenesulfonyl))-3-(3-oxocyclooctyl)urea,
1-(p-ethylbenzenesulfonyl)-3-(5-oxocyclononyl)urea,
1-(p-hexyloxybenzenesulfonyl)-3-(3-oxocyclononyl)urea,
1-(2,4-dichlorobenzenesulfonyl)-3-(5-oxocyclodecyl) urea,
1-benzenesulfonyl-3-(6-oxocycloundecyl)urea,
1-(m-chlorobenzenesulfonyl)-3-(6-oxocyclododecyl) urea and
1-(p-tolylsulfonyl)-3-(7-oxocyclododecyl)urea.

EXAMPLE 10

*1-(p-tolylsulfonyl)-3-(4-trans-acetoxycycloheptyl)urea*

Acetylation of 3 g. of 1-(p-tolylsulfonyl)-3-(4-trans-hydroxycycloheptyl)urea with 5.0 g. of acetic anhydride in about 30 ml. of pyridine gave 1-(p-tolylsulfonyl)-3-(4-trans-acetoxycycloheptyl)urea.

EXAMPLE 11

*1-(p-tolylsulfonyl)-3-(4-cis-methanesulfonyloxy-cycloheptyl)urea*

Acylation of 1 g. of 1-(p-tolylsulfonyl)-3-(4-cis-hydroxycycloheptyl)urea with 0.25 ml. methanesulfonyl chloride in about 10 ml. of pyridine gave 1-(p-tolylsulfonyl)-3-(4-cis-methanesulfonyloxycycloheptyl)urea.

In the same manner, following the procedure of Example 10 or 11, other compounds of Formula II wherein X is hydroxy, are converted to the acylates by reacting the selected 1-benzenesulfonyl-3-(hydroxycycloalkyl)urea with the anhydride or chloride of an acid, among which acids are those previously listed. The following acylates thus prepared are representative:

1-(p-tolylsulfonyl)-3-(3-trans-propionloxycyclopentyl) urea,
1-(p-tolylsulfonyl)-3-(7-benzoyloxycyclododecyl)urea, and
1-(p-chlorobenzenesulfonyl)-3-[4-(p-toluenesulfonyloxy) cyclohexyl]urea.

EXAMPLE 12

*1-(p-tolylsulfonyl)-3-(4-oxocycloheptyl)urea cyclic ethylene ketal*

A solution of 1.0 g. of 1-(p-tolylsulfonyl)-3-(4-oxocycloheptyl)urea in 3.0 ml. of redistilled ethylene glycol and about 30 ml. of redistilled toluene in a reflux apparatus equipped with a water trap is heated nearly to boiling and 15 mg. of p-toluenesulfonic acid monohydrate is added. The mixture is refluxed for about 2 hours. An additional 1.5 ml. of ethylene glycol is then added and boiling is continued until the reaction is essentially complete (a total of about 5 hours boiling is usually sufficient). The reaction mixture is then cooled, washed with saturated sodium bicarbonate solution and twice with water. The organic phase is dried over anhydrous sodium sulfate and evaporated to a residue which is recrystallized from acetone-Skellysolve B to give 1-(p-tolylsulfonyl)-3-(4-oxocycloheptyl)urea cyclic ethylene ketal as a crystalline solid.

In the same manner, other cyclic ethylene ketals of the compounds of Formula II wherein X is keto can be prepared by substituting other 1-benzenesulfonyl-3-(oxocycloalkyl)ureas for 1-(p-tolylsulfonyl)-3-(4-oxocycloheptyl)urea and similarly other cyclic alkylene ketals can be prepared by reacting the selected 1-benzenesulfonyl-3-(oxocycloalkyl)urea with other alkanediols. The following products are representative:

1-(p-tolylsulfonyl)-3-(3-oxocyclopentyl)urea cyclic ethylene ketal,
1-(p-acetylbenzenesulfonyl)-3-(4-oxocyclohexyl)urea cyclic ethylene ketal,
1-(xylylsulfonyl)-3-(3-oxocycloheptyl)urea cyclic propylene ketal, and
1-(p-bromobenzenesulfonyl)-3-(5-oxocyclooctyl)urea cyclic trimethylene ketal.

EXAMPLE 13

Oxygenation of N-cyclohexylbenzamide

The bioconversion and extraction procedures of Example 1 were repeated using 10 l. of sterilized medium of the same composition, the microorganism *Sporotrichum sulfurescens*, ATTC 7159, and 2 g. of N-cyclohexylbenzamide as the substrate to give a residue shown by chromatographic analysis to be a mixture of oxygenated N-cyclohexylbenzamides. The product thus obtained was stirred with methylene chloride to give as the major component 0.46 g. of N-(4-hydroxycyclohexyl)benzamide. The filtrate was chromatographed on Florisil, giving additional N-(4-hydroxycyclohexyl)benzamide. The combined product was recrystallized from acetone-Skellysolve B to give 0.64 g. of N-(4-hydroxycyclohexyl)-benzamide, M.P. 213.4–214° C.

*Analysis.*—Calcd. for $C_{13}H_{17}NO_2$: C, 71.20; H, 7.82; N, 6.39. Found: C, 70.83; H, 7.91; N, 6.47.

EXAMPLE 14

Oxygenation of N-cyclohexylbenzamide

The procedure of Example 13 was repeated using the same substrate but substituting the microorganism *Rhizopus arrhizus*, ATCC 11145, for *Sporotrichum sulfurescens* to give a mixture of oxygenated N-cyclohexylbenzamides of which the major component, N-(3-hydroxycyclohexyl)benzamide, was converted by oxidation with chromic acid to crystalline N-(3-oxocyclohexyl)-benzamide.

EXAMPLE 15

Oxygenation of N-cycloheptylbenzamide

The bioconversion and extraction procedures of Example 13 were repeated using the same microorganism, *Sporotrichum sulfurescens*, ATCC 7159, and 2 g. of N-cycloheptylbenzamide as the substrate. Chromatographic analysis showed that the product thus obtained was a mixture of N-(oxocycloheptyl)-benzamides and N-(hydroxycycloheptyl)benzamides. This mixture was chromatographed on Florisil and eluted with Skellysolve B containing increasing proportions of acetone, giving as the major components N-(4-oxocycloheptyl)benzamide and N-(4-hydroxycycloheptyl)benzamide. The eluates containing primarily N-(4-hydroxycycloheptyl)benzamide were combined, evaporated to dryness, and the residue was oxidized with chromic acid. The thus obtained N-(4-oxocycloheptyl)benzamide was combined with that obtained directly from the fermentation and chromatographed on Florisil in the same manner, giving 0.98 g. of N-(4-oxocycloheptyl)benzamide which after recrystallization from acetone-Skellysolve B melted at 143–145° C. A sample of N-(4-oxocycloheptyl)benzamide, recrystallized from acetone-Skellysolve B for analysis, melted at 145–147° C.

*Analysis.*—Calcd. for $C_{14}H_{17}NO_2$: C, 72.70; H, 7.41; N, 6.06. Found: C, 72.42; H, 7.61; N, 6.05.

EXAMPLE 16

Oxygenation of N-cyclododecylbenzamide

The procedures of Example 13 were repeated, using the microorganism *Rhizopus arrhizus*, ATCC 11145, and 2 g. of N-cyclododecylacetamide as the substrate to give a product shown by chromatographic analysis to be a mixture of oxygenated N-cyclodoecylbenzamides. This mixture was chromatographed on Florisil and eluted with Skellysolve B containing increasing proportions of acetone, giving N-(6-oxocyclododecyl)benzamide and N-(7-oxocyclododecyl)benzamide as the major components.

EXAMPLE 17

Oxygenation of N-cyclodecylbenzamide

The bioconversion and extraction procedures of Example 13 were repeated using the same microorganism, *Sporotrichum sulfurescens*, ATCC 7159, and 2 g. of N-cyclodecylbenzamide as the substrate to give a product shown by chromatographic analysis to be a mixture of oxygenated N-cyclodecylbenzamides. The mixture thus obtained was chromatographed on Florisil to give a mixture of N-(oxocyclodecyl)benzamides, identified by infrared spectra, of which the major components were N-(6-oxocyclodecyl)benzamide and N-(5-oxocyclodecyl)-benzamide; N-(6-oxocyclodecyl)benzamide was the predominant isomer.

EXAMPLE 18

Oxygenation of N-cyclopentylbenzamide

The bioconversion and extraction procedures of Example 13 are repeated using the microorganism *Cyathus poeppigii*, CBS, and 2 g. of N-cyclopentylbenzamide as the substrate to give a product shown by chromatographic analysis to be a mixture of oxygenated N-cyclopentylbenzamides. The mixture thus obtained is chromatographed on Florisil to give of a mixture of N-(oxocyclopentyl)benzamides and N-(hydroxycyclopentyl)benzamides, identified by infrared spectra, of which the major components are N-(3-oxocyclopentyl)benzamide and N-(3-hydroxycyclopentyl)benzamide.

EXAMPLE 19

Oxygenation of N-cyclononylbenzamide

Following the bioconversion and extraction procedures of Example 13 N-cyclonoylbenzamide is subjected to bioconversion to give N-(oxocyclononyl)benzamides and N-(hydroxycyclononyl)benzamides, the major components being N-(4- and 5-oxocyclononyl)benzamides and N-(4- and 5-hydroxycyclononyl)benzamides.

EXAMPLE 20

N-(4-oxocyclohexyl)benzamide

N-(4-hydroxycyclohexyl)benzamide (100 mg.) from Example 13 was dissolved in 50 ml. of acetone and oxidized with excess chromic acid to give, after recrystallization from acetone-Skellysolve B, 80 mg. of N-(4-oxocyclohexyl)benzamide, M. P. 174–175° C.

*Analysis.*—Calcd. for $C_{13}H_{15}NO_2$: C, 71.86; H, 6.96; N, 6.45. Found: C, 72.00; H, 6.97; N, 6.85.

The other N-(hydroxycycloalkyl)benzamides of Formula V can likewise be oxygenated to obtain the corresponding N-(oxocycloalkyl)benzamides.

EXAMPLE 21

N-(4-oxocycloheptyl)benzamide cyclic ethylene ketal

A mixture of 19.6 g. of N-(4-oxocycloheptyl)benzamide, 0.3 g. of p-toluenesulfonic acid monohydrate, 50 ml. of ethylene glycol, and 500 ml. of benzene was stirred and refluxed through a water trap for four hours. The mixture was cooled, washed quickly with 5% sodium bicarbonate solution and then with water. During this time, crystallization began to occur in the organic phase. Methylene chloride was added to help dissolve the crystals and the mixture was filtered through anhydrous sodium sulfate. Evaporation in vacuum gave a residue which was recrystallized from benzene-Skellysolve B to give 21.6 g. of N-(4-oxocycloheptyl) benzamide cyclic ethylene ketal, M.P. 138–140°. For analysis, a sample was recrystallized twice from benzene-Skellysolve B to M.P. 141–143°.

*Analysis.*—Calcd. for $C_{16}H_{21}NO_3$: C, 69.79; H, 79.69; N, 5.09. Found: C, 69.53; H, 7.63; N, 5.13.

In the same manner following the procedures of Example 21 other N-(oxocycloalkyl)benzamides of Formula V, wherein X is keto, can likewise be converted to the corresponding cyclic ethylene ketals thereof. The following products are representative:

N-(4-oxocyclohexyl)benzamide cyclic ethylene ketal,
N-(3-oxocyclohexyl)benzamide cyclic ethylene ketal
N-(5-oxocyclooctyl)benzamide cyclic ethylene ketal, and
N-(4-oxocyclooctyl)benzamide cyclic ethylene ketal.

In the same manner other cyclic alkylene ketals can be prepared by reacting the selected free ketone with the appropriate alkanediol.

EXAMPLE 22

*Benzyl-4-oxocycloheptylamine cyclic ethylene ketal*

Over a period of approximately fifty hours, 17.3 g. of N-(4-oxocycloheptyl)benzamide cyclic ethylene ketal was extracted from a Soxhlet thimble into a solution of 3 g. of lithium aluminum hydride in one liter of ether. At the end of this time, water was added to destroy the excess hydride, the ether solution was decanted and concentrated. Cooling afforded 5.5 g. of recovered ketal amide, separated by filtration. Evaporation of the filtrate gave a crystalline residue shown to contain ketal amide as well as ketal amine. Chromatography on Florisil afforded a clean separation of these two constituents. The desired benzyl-4-oxocycloheptylamine cyclic ethylene ketal fractions were combined and recrystallized from acetone-Skellysolve B to M.P. 55–57°.

*Analysis.*—Calcd. for $CN_{16}H_{23}O_2$: C, 73.53; H, 8.87; N, 5.36. Found: C, 73.51; H, 8.61; N, 5.32.

In the same maner substituting other N-(oxocycloalkyl) benzamide cyclic alkylene ketals (V) or N-(hydroxycycloalkyl) benzamides (V) as starting material in Example 22 is productive of the corresponding benzyl-cycloalkylamines of Formula VI; for example:

N-(4-oxocyclohexyl)benzamide cyclic ethylene ketal,
N-(3-oxocyclohexyl)benzamide cyclic ethylene ketal,
N-(5-oxocyclooctyl)benzamide cyclic ethylene ketal,
N-(4-oxocyclooctyl)benzamide cyclic ethylene ketal,
N-(4-hydroxycyclohexyl)benzamide,
N-(3-hydroxycyclohexyl)benzamide,
N-(4-hydroxycycloheptyl)benzamide,
N-(5-hydroxycyclooctyl)benzamide, and
N-(4-hydroxycyclooctyl)benzamide, there is obtained:
benzyl-4-oxocyclohexylamine cyclic ethylene ketal,
benzyl-3-oxocyclohexylamine cyclic ethylene ketal,
benzyl-5-oxocyclooctylamine cyclic ethylene ketal,
benzyl-4-oxocyclooctylamine cyclic ethylene ketal,
benzyl-4-hydroxycyclohexylamine,
benzyl-3-hydroxycyclohexylamine,
benzyl-4-hydroxycycloheptylamine,
benzyl-5-hydroxycyclooctylamine, and
benzyl-4-hydroxycyclooctylamine, respectively.

EXAMPLE 23

*4-oxocycloheptylamine cyclic ethylene ketal*

A solution of about 7.5 g. of benzyl-4-oxocycloheptylamine cyclic ethylene ketal in 75 ml. of absolute ethanol was hydrogenated at room temperature and 40 p.s.i.g. over 1 g. of 10% palladium-charcoal catalyst. The theoretical hydrogen uptake required approximately 7 hours, after which no further uptake of hydrogen was observed. The mixture was filtered through Celite and the filtrate evaporated in vacuo, giving a colorless oil that gradually turned brown. This oil, which was an extremely avid carbon dioxide scavenger and had an infrared spectrum consistent with its formulation as 4-oxocycloheptylamine cyclic ethylene ketal, weighed 5.36 g. It was not purified further, but was used directly for the preparation of the desired sulfonylurea.

In the same manner substituting other benzylcycloalkylamines (VI) as starting material in Example 23, is productive of the corresponding compounds of Formula IVa. For example using the compound prepared and listed in the last paragraph of Example 22, above as starting materials there is obtained:

4-oxocyclohexylamine cyclic ethylene ketal,
3-oxocyclohexylamine cyclic ethylene ketal,
5-oxocyclooctylamine cyclic ethylene ketal,
4-oxocyclooctylamine cyclic ethylene ketal,
4-hydroxycyclohexylamine,
3-hydroxycyclohexylamine,
4-hydroxycycloheptylamine,
5-hydroxycyclooctylamine, and
4-hydroxycyclooctylamine, respectively.

EXAMPLE 24

*4-oxocycloheptylamine*

A mixture of 5.0 g. of 4-oxocycloheptylamine cyclic ethylene ketal in 100 ml. of methanol, 20 ml. of water and 12.0 ml. of concentrated hydrochloric acid was stirred at room temperature for about 2 hours, diluted with water, the bulk of the methanol is removed under reduced pressure. The remainder neutralized with dilute sodium hydroxide solution and extracted with chloroform to give 4-oxocycloheptylamine as an oil, which can be used in the following example without further purification.

In the same manner other oxocycloalkylamine cyclic alkylene ketals of Formula IVa can be substituted as starting material in Example 24 to obtain the free ketones of Formula IV, for example:

4-oxocyclohexylamine cyclic ethylene ketal,
3-oxocyclohexylamine cyclic ethylene ketal,
5-oxocyclooctylamine cyclic ethylene ketal,
4-oxocyclooctylamine cylic ethylene ketal, is productive of:
4-oxocyclohexylamine,
3-oxocyclohexylamine,
5-oxocyclooctylamine, and
4-oxocyclooctylamine, respectively.

EXAMPLE 25

*1-(p-tolylsulfonyl)-3-(4-oxocycloheptyl)urea cyclic ethylene ketal*

The mixing of 5.36 g. of crude 4-oxocycloheptylamine cyclic ethylene ketal and 7.60 g. of methyl N-p-toluenesulfonylurethane generated heat spontaneously. The mixture was heated further at 135° for approximately 15 minutes, during which time extensive frothing occurred. It was cooled to room temperature, giving a tan glass that was taken up in 50 ml. of acetone. Crystallization occurred readily, and the product was recovered by filtration and washed with a small amount of cold acetone, affording 2.93 g. of 1-p-tolylsulfonyl-3-(4-oxocycloheptyl)urea cyclic ethylene ketal. For analysis a sample was thrice recrystallized from acetone to M.P. 175–177°.

*Analysis.*—Calcd. for $C_{17}H_{24}N_2O_5S$: C, 55.4; H, 6.6; N, 7.6; S, 8.7. Found: C, 55.47; H, 6.57; N, 7.46; S, 8.64.

In the same manner other cycloalkylamines (IV) can be substituted as starting material in Example 25, in place of 4-oxocycloheptylamine cyclic ethylene ketal, to obtain the corresponding 1 - (p - tolylsulfonyl) - 3 - (oxygenated cycloalkyl)ureas of Formula IIa, for example:
4-oxocyclohexylamine cyclic ethylene ketal,
3-oxocyclohexylamine cyclic ethylene ketal,
5-oxocyclooctylamine cyclic ethylene ketal,
4-oxocyclooctylamine cyclic ethylene ketal,
4-hydroxycyclohexylamine,
3-hydroxycyclohexylamine,
4-hydroxycycloheptylamine,
5-hydroxycyclooctylamine,
4-hydroxylcyclooctylamine,
4-oxocyclohexylamine,
3-oxocyclohexylamine,
4-oxocycloheptylamine,
5-oxocyclooctylamine, and
4-oxocyclooctylamine is productive of:
1-(p-tolylsulfonyl)-3-(4-oxocyclohexyl)urea cyclic ethylene ketal,
1-(p-tolylsulfonyl)-3-(3-oxocyclohexyl)urea cyclic ethylene ketal, 1-(p-tolylsulfonyl)-3-(5-oxocyclooctyl)urea cyclic ethylene ketal,
1-(p-tolylsulfonyl)-3-(4-oxocyclooctyl)urea cyclic ethylene ketal,
1-(p-tolylsulfonyl)-3-(4-hydroxycyclohexyl)urea,
1-(p-tolylsulfonyl)-3-(3-hydroxycyclohexyl)urea,
1-(p-tolylsulfonyl)-3-(4-hydrocycloheptyl)urea,
1-(p-tolylsulfonyl)-3-(5-hydroxycyclooctyl)urea,
1-(p-tolylsulfonyl)-3-(4-hydroxycyclooctyl)urea,
1-(p-tolylsulfonyl)-3-(4-oxocyclohexyl)urea,
1-(p-tolylsulfonyl)-3-(3-oxocyclohexyl)urea,
1-(6-tolylsulfonyl)-3-(4-oxocycloheptyl)urea,
1-(p-tolylsulfonyl)-3-(5-oxocyclooctyl)urea, and
1-(p-tolylsulfonyl)-3-(4-oxocyclooctyl)urea, respectively.

In the same manner following the general procedure of Example 25, but substituting other arylsulfonylurethanes (III), in place of p-toluenesulfonylurethane and using the appropriate cycloalkylamine (IV) is productive of the other compounds of Formula IIa of this invention as illustrated by the following representative reactions:

p-acetylbenzenesulfonylurethane with 4-oxocyclohexylamine cyclic ethylene ketal to obtain 1-(p-acetylbenzenesulfonyl)-3-(4-oxocyclohexyl)urea cyclic ethylene ketal;
p-acetylbenzenesulfonylurethane with 4-oxocyclohexylamine to obtain 1-(p-acetylbenzenesulfonyl)-3-(4-oxocyclohexyl)urea;
p-acetylbenzenesulfonylurethane with 4-hydroxycyclohexylamine to obtain 1-(p-acetylbenzenesulfonyl)-3-(4-hydroxycyclohexyl)urea;
p-(1-hydroxyethyl)benzenesulfonylurethane with 4 - oxocyclohexylamine cyclic ethylene ketal to obtain 1-[p-(1-hydroxyethyl)benzenesulfonyl] - 3 - (4 - hydroxycyclohexyl)urea cyclic ethylene ketal;
p-(1-hydroxyethyl)benzenesulfonylurethane with 4-oxocyclohexylamine to obtain 1-[p-(1-hydroxyethyl)benzenesulfonyl]-3-(4-oxocyclohexyl)urea;
p - (1 - hydroxyethyl)benzenesulfonylurethane with 4-hydroxycyclohexylamine to obtain 1-[p-(1-hydroxyethyl)benzenesulfonyl]-3-(4-hydroxycyclohexyl)urea;
2,4-dichlorobenzenesulfonylurethane with 4-oxocycloheptylamine cyclic ethylene ketal to obtain 1-(2,4-dichlorobenzenesulfonyl)-3-(4-oxocycloheptyl)urea cyclic ethylene ketal;
3,4-diethylbenzenesulfonylurethane with 5-oxocyclooctylamine cyclic ethylene ketal to obtain 1-(3,4-diethylbenzenesulfonyl)-3-(5-oxocyclooctyl)urea cyclic ethylene ketal, and the like.

We claim:
1. A compound of the formula:

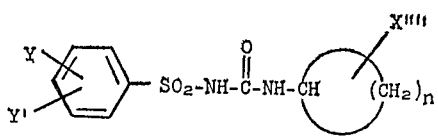

wherein $n$ is a whole number from 4 to 11, inclusive; Y and Y' are selected from the group consisting of hydrogen, lower-alkyl of 1 to 8 carbon atoms, inclusive, lower-alkoxy of 1 to 8 carbon atoms, inclusive, lower-alkanoyl of 2 to 8 carbon atoms, inclusive, and halogen; and X'''' is selected from the group consisting of keto, and cyclic lower-alkylene ketal, in which lower-alkylene is an alkylene substituent of 2 to 8 carbon atoms, inclusive.

2. A compound of the formula:

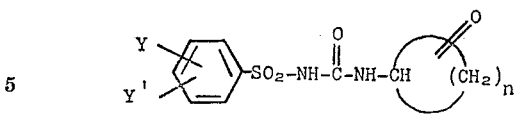

wherein $n$ is a whole number from 4 to 11, inclusive; Y and Y' are selected from the group consisting of hydrogen, lower-alkyl of 1 to 8 carbon atoms, inclusive, lower-alkoxy of 1 to 8 carbon atoms, inclusive, lower-alkanoyl of 2 to 8 carbon atoms, inclusive, and halogen.

3. 1-(p-tolylsulfonyl)-3-(5-hydroxycyclododecyl)urea.
4. 1-(p-tolylsulfonyl)-3-(6-hydroxycyclododecyl)urea.
5. 1-(p-tolylsulfonyl)-3-(7-hydroxycyclododecyl)urea.
6. 1-(p-tolylsulfonyl)-3-(3-oxocyclopentyl)urea.
7. 1 - (p - acetylbenzenesulfonyl)-3-(4-oxocyclohexyl)urea.
8. 1-(p-tolylsulfonyl)-3-(4-oxocycloheptyl)urea.
9. A compound of the formula:

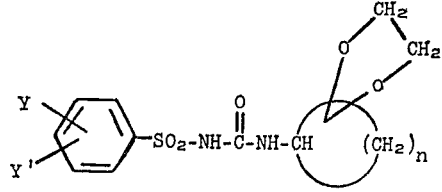

wherein $n$ is a whole number from 4 to 11, inclusive; Y and Y' are selected from the group consisting of hydrogen, lower-alkyl of 1 to 8 carbon atoms, inclusive, lower-alkoxy of 1 to 8 carbon atoms, inclusive, lower-alkanoyl of 2 to 8 carbon atoms, inclusive, and halogen.

10. 1 - (p - tolylsulfonyl) - 3 - (4-oxocycloheptyl)urea cyclic ethylene ketal.

References Cited

UNITED STATES PATENTS

| | | | |
|---|---|---|---|
| 2,370,586 | 2/1945 | Senkus | 260—340.7 |
| 2,735,800 | 2/1956 | Murray et al. | 195—51 |
| 2,968,158 | 1/1961 | Ruschig et al. | 260—553 X |
| 2,975,212 | 3/1961 | Wagner et al. | 260—553 |
| 3,112,345 | 11/1963 | Stansbury et al. | 260—563 |
| 3,128,182 | 4/1964 | Bard et al. | 260—563 X |
| 3,161,682 | 12/1964 | Lesesne et al. | 260—563 X |
| 3,232,981 | 2/1966 | Haack et al. | 260—553 |

FOREIGN PATENTS

| | | |
|---|---|---|
| 831,044 | 4/1960 | Great Britain. |
| 912,789 | 12/1962 | Great Britain. |

OTHER REFERENCES

Baumgarten et al., J. Am. Chem. Soc., vol. 76, pages 4561–4 (1954).
Burford et al., J. Chem. Soc., 1957, pages 2937 to 2942.
Chemical Abstracts, vol. 41, cols. 101a to 102c (1947) (abstract of Mousseron et al.).
Chemical Abstracts, vol. 48, col. 10804 (1954).
Chemical Abstracts, vol. 52, col. 20630c (1958).
German printed publication No. 1,104,074 (Auslegeschrift) 2/58 (4 pages specification).
Migrdichian, Organic Synthesis, vol. 1, pages 76–78, Reinhold Pub. Corp. (1957).
Mousseron et al., Chemical Abstracts, vol. 44, cols. 3918 to 3919 (1950).

JOHN D. RANDOLPH, *Primary Examiner.*